United States Patent
Dibley et al.

[11] 3,798,962
[45] Mar. 26, 1974

[54] METHOD FOR PREDICTING MOVEMENTS OF STRUCTURAL MEMBERS EMPLACED IN THE EARTH

[75] Inventors: Leland L. Dibley, Livermore; Maurice Zaslawsky, San Jose; Alexander Blake, Livermore, all of Calif.

[73] Assignee: The United States of America as represented by the United States Atomic Energy Commission, Washington, D.C.

[22] Filed: Apr. 19, 1972

[21] Appl. No.: 247,220

[52] U.S. Cl. ................................ 73/88 E, 73/9
[51] Int. Cl. ...................... G01n 3/08, G01n 19/02
[58] Field of Search ............... 73/9, 93, 94, 103, 84, 73/88 E

[56] References Cited
UNITED STATES PATENTS
3,616,685  11/1971  Strom ........................................ 73/4
3,178,935  4/1965  McRitchie .............................. 73/94
3,589,175  6/1971  Boch ..................................... 73/104
3,404,460  10/1968  Livingston et al. .................. 73/88 E
3,611,794  10/1971  De Geeter .......................... 73/84

Primary Examiner—Richard C. Queisser
Assistant Examiner—Daniel M. Yasich
Attorney, Agent, or Firm—John A. Horan; F. A. Robertson; Clifton E. Clouse

[57] ABSTRACT

A method for measuring frictional and bearing resistance of compressed granular materials such as sand or gravel to both longitudinal and lateral motion of a long structural member emplaced in a cylindrical container with the granular material packed around the member. The granular material is compressed by means of a platen at one end of the container. Then force is applied between the member and container until the member moves. The frictional and bearing properties of the granular material and the strains in the member may be determined from the amount of force required for the movement. The member is moved axially and radially in separate steps.

4 Claims, 2 Drawing Figures

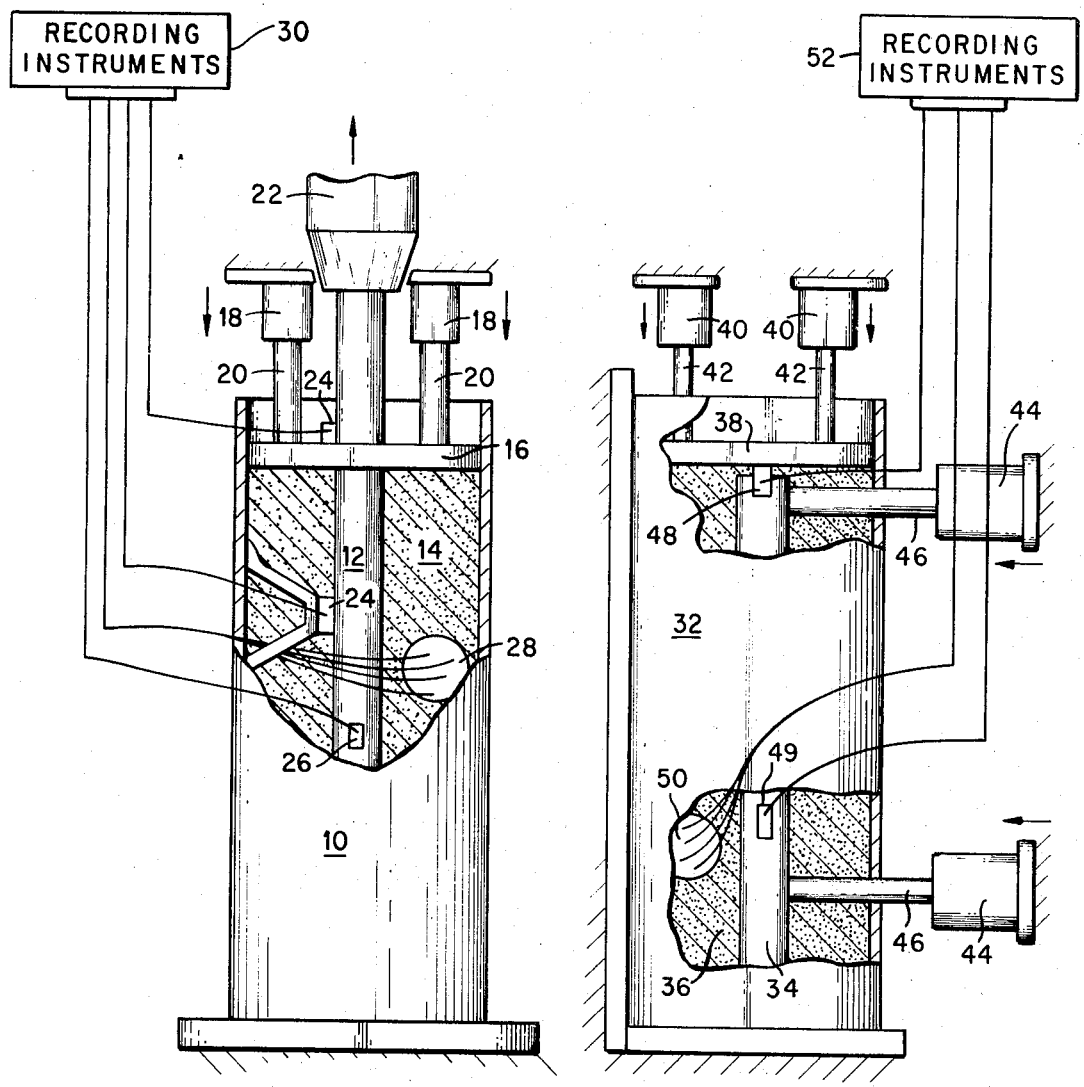
*Fig. 1*  *Fig. 2*

3,798,962

METHOD FOR PREDICTING MOVEMENTS OF STRUCTURAL MEMBERS EMPLACED IN THE EARTH

BACKGROUND OF THE INVENTION

The invention disclosed herein was made under, or in, the course of Contract No. W-7405-ENG-48 with the United States Atomic Energy Commission.

The invention relates to a method for determining the frictional and bearing resistance of compressed granular materials to longitudinal and lateral motion of a long structural member, and more particularly it relates to a laboratory method for measuring the frictional and bearing resistance of compressed gravel or sand to axial and radial motion of a long structural member and the resulting strain of the member.

In the design of various earth situated structures such as found in wells, mines, tunnels and caverns and in the design of other earth connected structures such as dams, foundations and pilings, it is important to know the friction and bearing resistance between the granular material and structural members used in such structures and the resulting strains of the members in order to anticipate the behavior of the structures under expected stresses. This information enables the designer to specify efficient structures that will withstand the stresses. Heretofore, no method has been available for determining in the laboratory frictional and bearing resistances of granular material to the movement of structural members and the resulting strains of the members. Such information is especially useful in designing earthquake resistant structures and structures for monitoring underground nuclear explosions. In the latter structures, granular materials such as sand and pea gravel are widely used and are known as stemming materials. The nuclear device is placed in a hole deep underground. The hole is connected to the surface of the earth by means of a long downhole pipe which carries electrical cables and other equipment used for monitoring the explosion. When the nuclear device is in position in the hole, sand and gravel stemming materials along with appropriately placed plugs of concrete are used to fill up, or stem, the hole to ensure containment of the explosion. The method of the present invention is particularly useful for predicting the stresses arising during emplacement of a downhole pipe and the behavior of the pipe when surrounded by stemming material and subjected to shock from a nuclear explosion.

SUMMARY OF THE INVENTION:

The invention is a method that is useful in the laboratory for measuring the frictional and bearing resistances of granular materials to longitudinal and lateral movements of long structural members and for measuring the resulting strains in the members, and comprises the steps of placing a long structural member in a container, packing granular material around the member, applying and holding a force to the granular material to uniformly compress it around the member, applying increasing amounts of force in successive steps between the member and the container to urge the member to move with respect to the container, measuring the pressure of the granular material at various locations in the container and measuring the movements and strains of the long structural member during each step of increased force between the member and container.

It is an object of the invention to determine the behavior under stress of a long structural member surrounded by a compressed granular material.

Another object is to determine the frictional resistance between a compressed granular material and a long structural member when the member is subjected to longitudinal stress, to determine the bearing resistance of the material when the member is subjected to lateral stresses, and to determine the resultant strains set up in the member along its length when it is subjected to the longitudinal and lateral stresses.

Other objects and advantageous features of the invention will be apparent in a description of a specific embodiment thereof, given by way of example only, to enable one skilled in the art to readily practice the invention which is described hereinafter with reference to the accompanying drawing.

BRIEF DESCRIPTION OF THE DRAWING:

FIG. 1 is a side view, with portions broken away, of apparatus for practicing the method of the invention for determining the frictional resistance of a compressed granular material to longitudinal movement of a long structural member and the resulting strains in the member.

FIG. 2 is a side view, with portions broken away, of apparatus for practicing the method of the invention for determining the bearing resistance of a compressed granular material to lateral movement of a long structural member and the resulting strains in the member.

DESCRIPTION OF AN EMBODIMENT:

Referring to the drawing there is shown in FIG. 1 a cylindrical container 10 in which a long structural member such as pipe 12 is centrally located. A granular material 14 such as sand or gravel is packed around the pipe 12. A platen 16 is located at the upper end of the cylinder for movement into the cylinder to compress the material 14 and hold it compressed. The compressing force may be applied to the platen 16 by means of hydraulic actuator 18 acting through driving rods 20. The pipe 12 is connected such as by means of a clamp 22 to a device, such as a conventional universal testing machine, for applying axial force to the pipe to urge it out of the container 10. Conventional sensors 24 may be mounted at various locations along the pipe length for sensing axial movement of the pipe relative to the container. Conventional strain gauge sensors 26 may also be located along the length of the pipe for sensing local pipe strains. Sensors 28 are also placed at various locations in the granular material 14 in order to detect the pressure resulting from the compression of the material.

In operation, various compression loads are applied to the granular material by means of the platen 16. For each compression load, increasing amounts of axial force are applied in successive steps to the pipe 12 by means of the clamp 22. The resulting movements and strains of the pipe are recorded as a function of the compression load of the granular material and the force exerted through the clamp 22 by means of conventional recording instruments 30. Such data is then used for establishing the frictional resistance of the granular material to the structural member and the behavior of the structural member under axial stress.

In FIG. 2 there is shown a cylindrical container 32 in which a long structural member such as pipe 34 is centrally located. A granular material 36 such as sand or gravel is packed around the pipe. A platen 38 is located at the upper end of the cylinder for movement into the cylinder to compress the material 36 and hold it compressed. The compressing force may be applied to the platen by means of hydraulic actuator 40 acting through driving rods 42. Force to move the pipe 34 laterally may be applied to the pipe by means of hydraulic actuator 44 acting through driving rods 46 which extend through the wall of the container 32 between the actuators 44 and the pipe. Conventional sensors 48 may be mounted at various locations along the pipe length for sensing lateral movement of the pipe relative to the container. Conventional strain gauge sensors 49 may also be located along the length of the pipe for sensing local pipe strains. Sensors 50 may be placed in the granular material for detecting the pressure resulting from compression of the material.

In operation, various compression loads are applied to the granular material by means of the platen 38. For each compression load, increasing amounts of lateral force are applied to the pipe by means of the actuators 44 and rods 46. The resulting movements and strains of the pipe are recorded as a function of the compression load of the granular material and the force exerted through the rods 46 by means of conventional recording instruments 52. Such data is then used for establishing the bearing resistance of the granular material to the structural member and the behavior of the structural member under lateral stress.

While an embodiment of the invention has been shown and described, further embodiments or combinations of those described herein will be apparent to those skilled in the art without departing from the spirit of the invention.

We claim:

1. A method for determining applied forces and resultant frictional forces developed by moving a structural member relative to a granular material that is under a predetermined constant compression, comprising the steps of:

placing a long structural member in a container, packing a granular material around the member, applying and holding at least one selected predetermined constant compressive force to the granular material to uniformly compress it around the member, measuring and recording the pressure of the granular material in the container, applying increasing amounts of force in successive steps on the member and relative to the container, and measuring, and recording during each step of increased force between the member and container, the movements of the member relative to the container, and the strains of the member.

2. The method of claim 1 wherein said increasing amounts of force are applied to the member in an axial direction.

3. The method of claim 1 wherein said increasing amounts of force are applied to the member in a lateral direction.

4. The method of claim 1 further including the step of changing the compressive force applied and held to the granular material and applying increasing amounts of said force in successive steps on the member and relative to the container for each changed compressive force applied and held to the granular material.

* * * * *